Patented Nov. 10, 1936

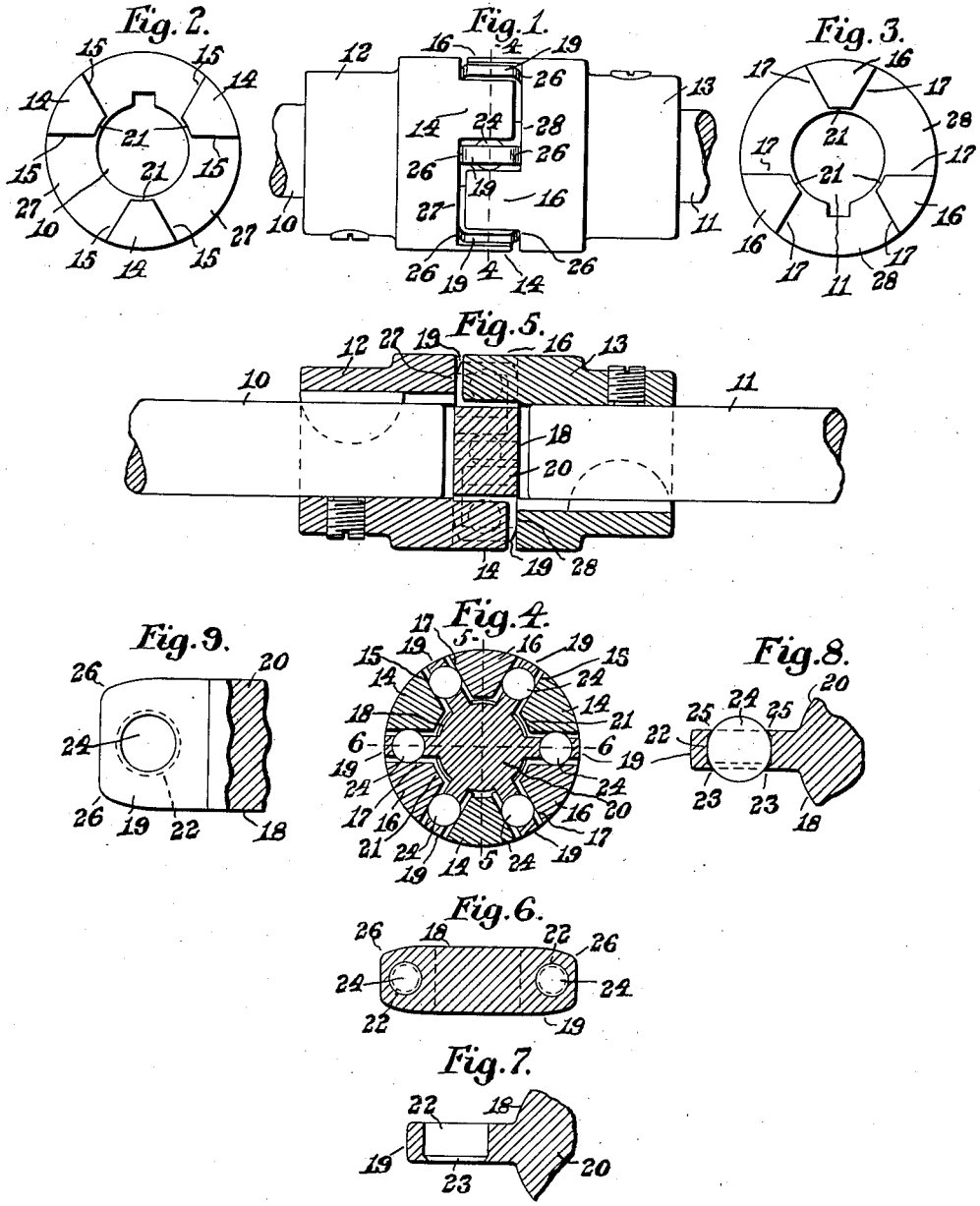

2,060,473

UNITED STATES PATENT OFFICE 2,060,473

FLEXIBLE COUPLING

Martin T. Schumb, East Milton, Mass., assignor to Boston Gear Works, Inc., North Quincy, Mass., a corporation of Massachusetts Application March 3, 1936, Serial No. 66,840

7 Claims. (Cl. 64—9)

This invention relates to flexible couplings for connecting two substantially alined revoluble shafts, the object of the invention being to obtain a more flexible connection between the coupling members secured to said shafts by providing each arm of the power-transmitting member with a freely revoluble steel ball bearing against flat hardened faces of two lugs projecting from opposed faces of said coupling members.

This object is attained by the mechanism illustrated in the accompanying drawing.

For the purpose of illustrating the invention, one preferred form thereof is illustrated in the drawing, this form having been found to give satisfactory and reliable results, although it is to be understood that the various instrumentalities of which the invention consists can be variously arranged and organized, and the invention is not limited to the precise arrangement and organization of these instrumentalities as herein shown and described except as required by the scope of the appended claims.

Of the drawing:

Figure 1 represents an elevation of a coupling embodying the principles of the present invention.

Figure 2 represents an end view of one of the coupling members thereof.

Figure 3 represents an end view of the other coupling member.

Figure 4 represents a transverse section of said coupling, the cutting plane being on line 4, 4 on Fig. 1.

Figure 5 represents a longitudinal section of the coupling, the cutting plane being on line 5, 5 on Fig. 4.

Figure 6 represents a horizontal section of the power-transmitting member, the cutting plane being on line 6, 6 on Fig. 4.

Figure 7 represents a section of a portion of the power-transmitting member showing one arm thereof with a ball-receiving socket therein.

Figure 8 represents a similar view showing the ball in said socket and the metal upset at the upper end of the socket to retain the ball in said socket, and Figure 9 represents a section of a portion of the power-transmitting member showing the face of one arm with the ball positioned therein.

Similar characters indicate like parts throughout the several figures of the drawing.

In the drawing, 10, 11 are two substantially alined revoluble shafts, the shaft 10 having secured thereto and revoluble therewith a coupling member 12, while the shaft 11 has a similar coupling member 13 secured thereto and revoluble therewith.

The coupling member 12 has formed thereon projecting lugs 14 the side bearing faces 15 of which are flat and hardened.

The coupling member 13 has similar projecting lugs 16 the side faces 17 of which are flat and hardened.

These flat hardened faces 15 and 17 of the lugs 14 and 16 are parallel for their entire length to each other and to a plane midway between them and radial to one of said shafts.

When the coupling is in use the projecting lugs 14 and 16 of the coupling members 12 and 13 extend toward each other as shown in Figs. 1 and 5, the lugs 14 of the coupling member 12 being interposed between the lugs 16 of the coupling member 13.

Between the coupling members 12 and 13 is interposed a power-transmitting member 18 preferably of non-resilient material as metal.

This member 18 is provided with integral radiating arms 19 extending between and equally distant from the hardened bearing faces 15 and 17.

These arms 19 extend from a central hub 20 of the power-transmitting member 18, the peripheral face of which is separated from the inner arcuate ends 21 of the lugs 14 and 16.

Each arm 19 has a cylindrical socket 22 formed therein with a beveled shoulder 23 at one end thereof.

In each socket 22 is disposed a hardened steel ball 24, portions of which extend beyond the opposite faces of the arm 19.

The ball 24 rests upon the beveled shoulder 23 and when inserted into the socket 22 the metal of the arm 19 is upset as at 25 to prevent the displacement of the balls when in use.

Each ball 24 is free to move a slight distance endwise of said socket 22 and transversely of the arm 19 in which it is mounted.

These balls 24 are freely revoluble in the sockets 22 in any direction about their centers and bear against the hardened side faces 15 and 17 of the lugs 14, 16, said side faces being spaced apart a distance equal to the diameter of said balls.

The outer ends of the arms 19 are rounded over as at 26, thus providing a greater freedom of movement when the shafts 10 and 11 are inclined at an angle to each other.

The power-transmitting member 18 has a thickness greater than the length of the projecting lugs 14 and 16 and the opposite end faces thereof contact with opposed faces 27 and 28 on the coupling members 12 and 13, thus keeping the coupling members separated under all conditions.

When the shafts are moved into a position at an angle to each other, the hardened steel balls 24 will travel over the surfaces of the hardened faces 15 and 17 of the lugs 14 and 16, thus providing a great degree of flexibility to the coupling.

When the balls 24 are positioned in the sockets 22 in the manner heretofore described, the power-transmitting member 18 is complete and may be handled freely without danger of the balls 24 becoming displaced.

In view of this condition the assembling of the elements of the coupling is greatly facilitated.

As the side bearing faces 15 and 17 are of hardened steel and the balls 24 also are of hardened steel, there will be little wear either upon the balls 24 or the bearing faces 15, 17 and the coupling will be in working condition at all times.

It is obvious, that the balls 24 may revolve freely in any direction either in assembling the coupling members 12, 13, during the rotation of the shafts 10, 11 and also when the said shafts are disposed at an angle to each other.

The coupling is inexpensive to manufacture, has great wearing qualities, is easily assembled, and has a great degree of flexibility.

It is believed the operation and many advantages of the invention will be understood readily without further description.

Having thus described my invention, I claim:

1. A coupling for connecting two substantially aligned rotatable shafts one of which has slight end movement relatively to the other and consisting of a coupling member secured to each shaft, each coupling member having projecting lugs intermeshing with similar lugs on the other coupling member, said lugs having bearing faces flat throughout and which are equally spaced apart and for their entire length being throughout parallel to a plane midway between them and radial to one of said shafts, one of said coupling members having end movement with its shaft relative to the other, and a power-transmitting member mounted between said coupling members and consisting of a central member having radiating arms integral therewith in each of which is freely mounted a hardened steel ball contacting with adjacent flat faces of two of said lugs of opposite coupling members, said arms having a width less than the width of the space between the flat faces of the two adjacent lugs.

2. A coupling for connecting two substantially aligned rotatable shafts one of which has slight end movement relatively to the other and consisting of a coupling member secured to each shaft, each coupling member having projecting lugs intermeshing with similar lugs on the other coupling member, said lugs having bearing faces flat throughout and which are equally spaced apart and for their entire length being throughout parallel to a plane midway between them and radial to one of said shafts, one of said coupling members having end movement with its shaft relative to the other, and a power-transmitting member mounted between said coupling members and consisting of a central member having radiating arms integral therewith in each of which is freely mounted a hardened steel ball contacting with adjacent flat faces of two of said lugs of opposite coupling members, said arms having a width less than the width of the space between the flat faces of the two adjacent lugs, each arm having the distance between its side edges greater than the lengths of said lugs whereby said side edges engage the opposed faces of the coupling members when aligned to limit movement together of the coupling members.

3. A coupling for connecting two substantially aligned rotatable shafts one of which has slight end movement relatively to the other and consisting of a coupling member secured to each shaft, each coupling member having projecting lugs intermeshing with similar lugs on the other coupling member, said lugs having bearing faces flat throughout and which are equally spaced apart and for their entire length being throughout parallel to a plane midway between them and radial to one of said shafts, one of said coupling members having end movement with its shaft relative to the other, and a power-transmitting member mounted between said coupling members and consisting of a central member having radiating arms integral therewith in each of which is freely mounted a hardened steel ball contacting with adjacent flat faces of two of said lugs of opposite coupling members, said arms having a width less than the width of the space between the flat faces of the two adjacent lugs, each arm having the distance between its side edges greater than the lengths of said lugs whereby said side edges engage the opposed faces of the coupling members when aligned to limit movement together of the coupling members, the said side edges being rounded at their outer ends to permit angular disposition of the coupling member axes.

4. A flexible shaft coupling for angularly disposable and longitudinally movable shafts consisting of a pair of like members each having an end face provided with circumferentially spaced lugs projecting therefrom parallel to the axis of the member, the spaces between the lugs of each member being greater than the widths of the lugs of the other member to provide circumferentially spaced slots, the confronting faces of the lugs on the opposed members forming the sides of the slots and being plane surfaces throughout, the faces of each member being parallel and spaced from planes radial to the axis of the member, a single ball in each of said slots between the opposed plane faces of the lugs and engaging both sides of the slot in all positions of the coupling, and a ball cage holding said balls between said lugs.

5. A flexible shaft coupling for angularly disposable and longitudinally movable shafts consisting of a pair of like members each having an end face provided with circumferentially spaced lugs projecting therefrom parallel to the axis of the member, the spaces between the lugs of each member being greater than the widths of the lugs of the other member to provide circumferentially spaced slots, the confronting faces of the lugs on the opposed members forming the sides of the slots and being plane surfaces throughout, the faces of each member being parallel and spaced from planes radial to the axis of the member, a single ball in each of said slots between the opposed plane faces of the lugs and engaging both sides of the slot in all positions of the coupling, a substantially cylindrical member held between the lugs of the coupling members and having limited radial movement with respect thereto and arms radiating from said cylindrical member and extending into said slots, said arms having thicknesses less than the widths of said slots and provided with openings wherein said balls are held.

6. A flexible shaft coupling for angularly disposable and longitudinally movable shafts consisting of a pair of like members each having an end face provided with circumferentially spaced lugs projecting therefrom parallel to the axis of the member, the spaces between the lugs of each member being greater than the widths of the lugs of the other member to provide circumferentially spaced slots, the confronting faces of the lugs on the opposed members forming the sides of the slots and being plane surfaces throughout, the faces of each member being parallel and spaced from planes radial to the axis of the member, a single ball in each of said slots between the opposed plane faces of the lugs and engaging both sides of the slot in all positions of the coupling, a substantially cylindrical member held between the lugs of the coupling members and having limited radial movement with respect thereto and arms radiating from said cylindrical member extending into said slots, said arms having thicknesses less than the widths of said slots and provided with openings wherein said balls are held, each arm having the distance between its side edges greater than the lengths of said lugs whereby said side edges engage the opposed faces of the coupling members when aligned to limit movement together of the coupling members.

7. A flexible shaft coupling for angularly disposable and longitudinally movable shafts consisting of a pair of like members each having an end face provided with circumferentially spaced lugs projecting therefrom parallel to the axis of the member, the spaces between the lugs of each member being greater than the widths of the lugs of the other member to provide circumferentially spaced slots, the confronting faces of the lugs on the opposed members forming the sides of the slots and being plane surfaces throughout, the faces of each member being parallel and spaced from planes radial to the axis of the member, a single ball in each of said slots between the opposed plane faces of the lugs and engaging both sides of the slot in all positions of the coupling, a substantially cylindrical member held between the lugs of the coupling members and having limited radial movement with respect thereto and arms radiating from said cylindrical member and extending into said slots, said arms having thicknesses less than the widths of said slots and provided with openings wherein said balls are held, each arm having the distance between its side edges greater than the lengths of said lugs whereby said side edges engage the opposed faces of the coupling members when aligned to limit movement together of the coupling members, the said side edges being rounded at their outer ends to permit angular disposition of the coupling member axes.

MARTIN T. SCHUMB.